(12) United States Patent
Ros et al.

(10) Patent No.: US 11,789,343 B2
(45) Date of Patent: Oct. 17, 2023

(54) POINT-OF-VIEW RECORDING DEVICE

(71) Applicant: REVINAX, Montpellier (FR)

(72) Inventors: Maxime Ros, Montpellier (FR); Jean-Vincent Trives, Montpellier (FR)

(73) Assignee: REVINAX, Montpellier (FR)

( * ) Notice: Subject to any disclaimer, the term of this patent is extended or adjusted under 35 U.S.C. 154(b) by 0 days.

(21) Appl. No.: 16/341,070

(22) PCT Filed: Sep. 28, 2017

(86) PCT No.: PCT/FR2017/052648
§ 371 (c)(1),
(2) Date: Apr. 11, 2019

(87) PCT Pub. No.: WO2018/060636
PCT Pub. Date: Apr. 5, 2018

(65) Prior Publication Data
US 2020/0257184 A1    Aug. 13, 2020

(30) Foreign Application Priority Data

Sep. 29, 2016 (FR) .................................. 1659379
Jun. 8, 2017 (FR) .................................. 1755095

(51) Int. Cl.
*G03B 17/56* (2021.01)
*F16M 13/02* (2006.01)
(Continued)

(52) U.S. Cl.
CPC ......... *G03B 17/561* (2013.01); *F16M 13/022* (2013.01); *F16M 13/04* (2013.01);
(Continued)

(58) Field of Classification Search
CPC ..... G03B 17/561; F16M 13/04; F16M 13/022
See application file for complete search history.

(56) References Cited

U.S. PATENT DOCUMENTS 5,113,768 A * 5/1992 Brown .................. B61B 7/02
104/112
7,318,678 B2 * 1/2008 DeSorbo .............. G03B 17/561
396/420
(Continued)

FOREIGN PATENT DOCUMENTS

CH          710095 A2     3/2016
GB          2173016 A  * 10/1986  ........... F16M 11/046
(Continued)

OTHER PUBLICATIONS

ISR; European Patent Office; NL; dated Dec. 19, 2017.

*Primary Examiner* — Minh Q Phan
(74) *Attorney, Agent, or Firm* — Patshegen IP; Moshe Pinchas

(57) ABSTRACT

The invention relates to a subjective point-of-view recording device (60), which includes:
  a harness (10) attached to the body of a user;
  a camera (30) including at least one lens (305, 310) oriented in a direction, the camera being connected to the harness by a positionable arm running along the back of the user, and positioned above the user for point-of-view recording in said direction, the positionable arm including a rod for placing in position on the articulated harness with a rod for supporting the camera and at least one damper of the movement between the positioning rod and the supporting rod; and
  a means for stabilizing (20) the camera relative to the harness placed between the positionable arm and the camera.

17 Claims, 7 Drawing Sheets

(51) Int. Cl.
 *F16M 13/04* (2006.01)
 *F16M 11/10* (2006.01)
 *F16M 11/18* (2006.01)
 *F16M 11/20* (2006.01)
 *H04N 23/56* (2023.01)

(52) U.S. Cl.
 CPC ............ *F16M 11/105* (2013.01); *F16M 11/18* (2013.01); *F16M 11/2042* (2013.01); *F16M 2200/041* (2013.01); *F16M 2200/044* (2013.01); *H04N 23/56* (2023.01)

(56) References Cited

U.S. PATENT DOCUMENTS

| | | |
|---|---|---|
| 2004/0179170 A1 | 9/2004 | Harris |
| 2014/0270744 A1* | 9/2014 | Webb ................ H04N 5/23261 396/55 |
| 2016/0195798 A1* | 7/2016 | Nenov ................ H04N 5/2251 348/373 |
| 2016/0209732 A1 | 7/2016 | Liang |
| 2017/0038001 A1* | 2/2017 | Semple ................ F16M 11/046 |

FOREIGN PATENT DOCUMENTS

| | | | |
|---|---|---|---|
| GB | 2173016 A | 10/1986 | |
| WO | WO-9615404 A1 * | 5/1996 | ............. F16M 13/04 |

\* cited by examiner

POINT-OF-VIEW RECORDING DEVICE

TECHNICAL FIELD OF THE INVENTION

The present invention relates to a subjective point-of-view recording device. It applies, in particular, to the field of subjective point-of-view recording by a user from a position close to the user's eyes and to the user's line of sight.

More specifically, the present invention applies to the field of medical training, in particular for the subjective point-of-view recording of surgical operations. The present invention also applies to any profession transmitting manual expertise, for example the paramedical, technical and craftsmanship fields.

STATE OF THE ART

Currently, there are stabilization devices for recording used in particular in the cinematographic environment, such devices are marketed under the name "SteadyCam" (registered trademark), for example. These devices are attached by a belt around the lower back of the user operating the camera. The camera is positioned on an articulated arm attached to the belt on one of the user's sides. The camera is stabilized by a counterweight and hydraulic means. However, these devices are extremely heavy for a user, and more specifically, in the case of a subjective point-of-view recording, the user cannot have both hands free.

SUBJECT OF THE INVENTION

The present invention aims to remedy all or part of these drawbacks. In particular, the present invention aims to maintain the camera in a stabilized subjective point-of-view position. The stabilization makes it possible to have a better image quality, especially when it comes to delicate operations.

To this end, according to a first aspect, the present invention envisages a subjective point-of-view recording device, which comprises:
- a harness attached to a user's body;
- a camera including at least one lens oriented in one direction, the camera being connected to the harness by a positionable arm running along the back of the user, and positioned above the user for subjective point-of-view recording in said direction, the positionable arm including a rod for placing in position on the articulated harness with a rod for supporting the camera and at least one damper of the movement between the positioning rod and the supporting rod; and
- a means for stabilizing the camera relative to the harness placed between the positionable arm and the camera.

Thanks to these provisions, the movements of the stabilization means and camera are damped by mechanical means limiting the jerks due to the movement of the operator, for example an orthopedic surgeon. In particular, each damper also makes it possible to distribute the weight of the camera and the stabilization means over the arm so that the operator bearing the device is not unbalanced, for example. The camera is positioned above the user, providing subjective point-of-view recording. In this way, each image taken by the camera can represent the gestures and position held by the user. Thus, a student viewing an image or a film recorded using such a device can more easily understand the gestures to be made during a subsequent operation.

In some embodiments, the device that is the subject of the present invention comprises at least one attachment means linking two elements:
- the positioning rod and the supporting rod;
- the positioning rod and the damper; and/or
- the supporting rod and the damper.

These embodiments make it possible to move the supporting rod relative to the positioning rod as a function of the operator's build, the damper being moved as a function of the positioning.

In some embodiments, at least one attachment means forms at least one sliding pivot link with one of the elements, and at least one swivel link with the other element.

The advantage of these embodiments is to facilitate the positioning of the attachment means relative to the two elements.

In some embodiments, at least one attachment means comprises the guide slot of the at least one sliding pivot link, the element forming a slide, the attachment means comprising at least one cam lever for tightening the slide in the guide slot.

These embodiments make it possible to move the supporting rod relative to the positioning rod as a function of the operator's build.

In some embodiments, at least one attachment means comprises the guide slot of the at least one sliding pivot link, the element forming a slide, the attachment means comprising at least one cam lever for tightening the slide in the guide slot.

Thanks to these provisions, the positioning rod, supporting rod and damper elements can be moved relative to each other and adapted to the operator's build and the type of procedure he is performing, for example the type of surgery performed. Once the adaptation has been carried out, the tightening of the cam lever enables the elements to be fixed in position relative to each other.

In some embodiments, the attachment means comprises two cam levers, whose levers are in opposite directions.

The advantage of these embodiments is that, in the event of forces to translate the slide in the guide slot, one of the tightening levers tightens if the other untightens, regardless of the direction of the force.

In some embodiments, the damper mainly operates in compression.

The advantage of these embodiments is to dampen the lever arm due to the weight of the camera.

In some embodiments, the stabilization means is attached to a free extremity of the supporting rod having a circular arc shape.

These embodiments make it possible to bring the camera as close as possible to the eyes of the operator, to ensure subjective point-of-view recording.

In some embodiments, each rod comprises a body and two extremities, the articulation between the positioning rod and the supporting rod is located at one extremity of the positioning rod and on the body of the supporting rod, the supporting rod and the positioning rod forming a derrick.

These embodiments make it possible to extend above the head of the operator and to position the camera as close as possible to the eyes of the operator.

In some embodiments, the device that is the subject of the present invention comprises at least one first damper attached between one extremity of the supporting rod and the body of the positioning rod.

The advantage of this arrangement is to position the damper near the articulation and around the articulation to compensate the torques linked to the forces during a movement of the operator.

In some embodiments, the stabilization means is attached to the extremity of the supporting rod placed at the attachment extremity of each first damper.

Thanks to these provisions, the damper compensates for the lever arm caused by the weight of the stabilization means and the camera while damping the sudden movements.

In some embodiments, the device that is the subject of the present invention comprises at least one second damper between the body of the supporting rod and the body of the positioning rod.

These embodiments make it possible to dampen the movements in two different ways. For example, one damper can operate in compression while the other operates in traction. Or one damper can be hydraulic while the other is a deformation damper.

In some embodiments, each first and each second damper is located either side of the positioning rod.

The advantage of these embodiments is to distribute the weight of the supporting rod over the positioning rod, which makes it easier for the operator to carry the device.

In some embodiments, the second damper is a compression damper.

These embodiments make it possible to balance the arm in compression and in traction. In addition, the damping can be hydraulic for one and mechanical for the other, and in this way the damping is of better quality.

In some embodiments, the attachment of at least one damper with the supporting rod comprises a means for moving the attachment on the supporting rod.

These embodiments make it possible to adjust the distribution of forces over the rods to withstand the forces of the camera, which creates a lever arm.

In some embodiments, the device that is the subject of the present invention comprises at least one means for attaching the stabilization means to one extremity of the supporting rod.

Thanks to these provisions, the camera can be positioned as close as possible to the eyes of the operator and above the scene to be captured.

In some embodiments, the device that is the subject of the present invention comprises a battery mount on the body of the supporting rod, on the opposite side of the articulation relative to each attachment means.

These embodiments make it possible to balance the weight of the camera and stabilization means with the weight of the battery to make it easier for the operator to carry the equipment.

In some embodiments, the device that is the subject of the present invention comprises at least one means for attaching at least one articulated arm mount of at least one light source to the articulated arm.

Thanks to these provisions, the scene is adequately lit and the recording is of sufficient quality for training future doctors.

According to a second aspect, this invention envisages a subjective point-of-view recording device, which comprises:
  a harness attached to a user's body;
  a camera including at least one lens oriented in one direction, the camera being connected to the harness by a positionable arm running along the back of the user, and positioned above the user for subjective point-of-view recording in said direction; and
  a means for stabilizing the camera relative to the harness placed between the positionable arm and the camera, the stabilization means comprising at least three means for rotating around three perpendicular axes, each rotation means being equipped with a servomotor controlled as a function of the position of the camera and the position of the user.

Thanks to these provisions, the user can have his hands free, to perform an operation, for example. In addition, the camera is positioned above the user, providing subjective point-of-view recording. In this way, each image taken by the camera can represent the gestures and position held by the user. Thus, a student viewing an image or a film recorded using such a device can more easily understand the gestures to be made during a subsequent operation.

Also, given that the camera can comprise two lenses, the recordings made by means of the device can be represented three-dimensionally. In particular, these representations can be broadcast in virtual reality devices.

Also, as the camera is stabilized along three different axes, the image requires little post-processing, even in the event of a sudden movement by the carrier during the recording.

In some embodiments, each servomotor is subordinate to at least one piece of camera position data from a gyroscope.

These embodiments make it possible to obtain a position of the camera independent from the position of the camera relative to the harness.

In some embodiments, the camera comprises a predefined recording position relative to each axis of each servomotor and the control of each servomotor is configured to:
  keep the camera oriented in a predefined direction while a rotation of a servomotor is free in the two directions of rotation to keep the frame of the recording substantially unchanged; and
  once a stop is reached, move the camera in the predefined recording position to modify the frame of the recording.

These embodiments allow the user to turn slightly, to take an object for example, without the camera being moved. The camera therefore remains pointed at the same position, regardless of the user's gesture. Alternatively, if the user makes a movement to change position, by turning completely, the camera is automatically positioned to orient each lens to the new position seen by the user. Also, this movement is damped so as to make the image of the recording, as part of a film, for example, smoother.

In some embodiments, the axes of the servomotors correspond to the yaw, pitch and tilt axes of the camera.

The advantage of these embodiments is to correspond to predefined movements of the camera in an orthonormal reference space.

In some embodiments, the device that is the subject of the present invention comprises a fourth servomotor with an axis parallel to the axis of one of the three other servomotors, the axis of which corresponds to the roll axis of the camera.

Thanks to these provisions, the camera can be stabilized according to a larger number of parameters and the image is made smoother.

In some embodiments, the device that is the subject of the present invention comprises at least one light-emitting diode ("LED") lighting means attached to the camera or to the positionable arm and oriented in the direction of each lens.

These embodiments make it possible to provide sufficient light so that the scene recorded by the camera is representative. In particular, in the context of films of operations for teaching, the details must be easily repeatable by the person watching the film.

In some embodiments, each light-emitting diode is put in operation by an alternating current with a frequency equal to the frequency of recording by the camera.

Thanks to these provisions, the lifespan of the diode is prolonged, the user is not dazzled, and the quality of the images captured, especially in the context of continuous recordings, is not degraded by the frequency of the lighting.

In some embodiments at least one light-emitting diode is associated with a polarizing filter, and each lens has a polarizing filter with polarization orthogonal to the polarization of each polarizing filter associated with a light-emitting diode.

The advantage of these embodiments is to avoid the sensors of each lens of the camera being dazzled. For example, these embodiments strongly reduce the light reflections on metals.

In some embodiments, the device that is the subject of the present invention comprises a self-contained electric power source to supply the camera with electrical current, the source being located on the harness and configured to counterbalance the camera and the stabilization means.

These embodiments prevent the camera's center of gravity being placed in a location making the device unbalanced for the user.

In some embodiments, the device that is the subject of the present invention comprises a wireless electromagnetic wave emitter-receiver configured to transmit to at least one electronic system at least one image captured by the camera.

The advantage of these embodiments is to directly transmit at least one image captured for simultaneous learning by students, for example.

In some embodiments, the device comprises a means for storing each image captured by the camera, a storage means located on the harness and configured to counterbalance the camera and stabilization means.

These embodiments prevent the camera's center of gravity being too high and making the device unstable.

In some embodiments, the device that is the subject of the present invention comprises means for adjusting the position of the camera relative to the harness for a subjective point-of-view recording.

Thanks to these provisions, the camera can be placed directly above the eyes of the user to enable a more subjective point-of-view recording.

In some embodiments, the camera comprises at least two lenses oriented in the same direction.

These embodiments make it possible to make a three-dimensional recording for a virtual reality helmet, for example.

BRIEF DESCRIPTION OF THE FIGURES

Other advantages, aims and particular features of the invention will become apparent from the non-limiting description that follows of at least one particular embodiment of the device that is the subject of the present invention, with reference to drawings included in an appendix, wherein.

DESCRIPTION OF EXAMPLES OF REALIZATION OF THE INVENTION

The present description is given in a non-limiting way, each characteristic of an embodiment being able to be combined with any other characteristic of any other embodiment in an advantageous way. In addition, each parameter of an example of realization can be utilized independently from the other parameters of said example of realization.

It is now noted that the figures are not to scale.

Figure 5:
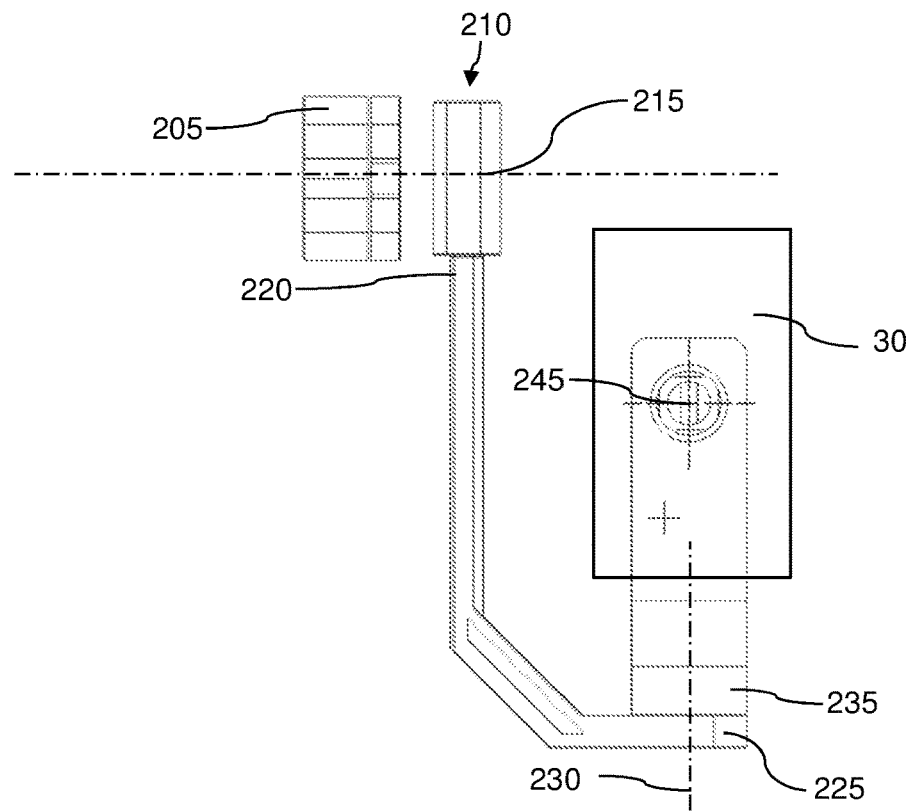
FIG. 5 represents, schematically and in a side view, the first particular embodiment of the stabilization means and camera of the device that is the subject of the present invention.
Figure 6:
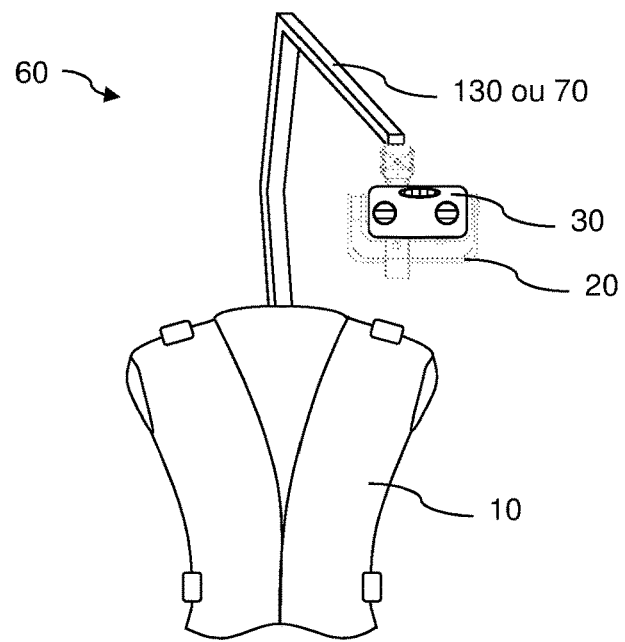
FIG. 6 represents, schematically, the first embodiment of the device that is the subject of the present invention.

FIG. 6 shows the device 60 that is the subject of the present invention. The device 60 that is the subject of the present invention comprises a harness 10, a positionable arm, 130 or 70, a stabilization means 20 and a camera 30 described below with regard to FIGS. 1 to 5.

Figure 1:
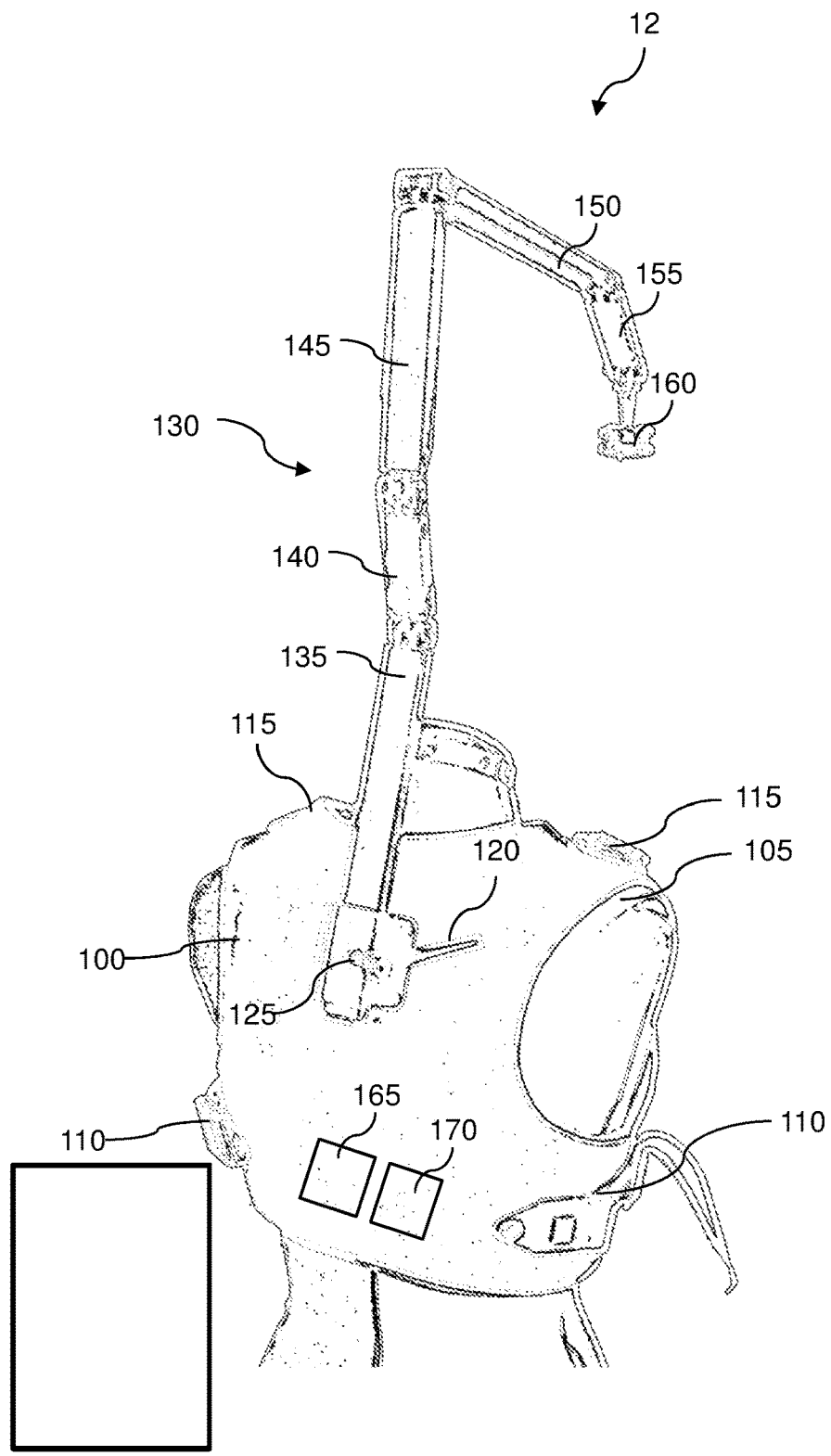
FIG. 1 represents, schematically and in perspective, a first particular embodiment of the harness and positionable arm of the device that is the subject of the present invention.
Figure 2:
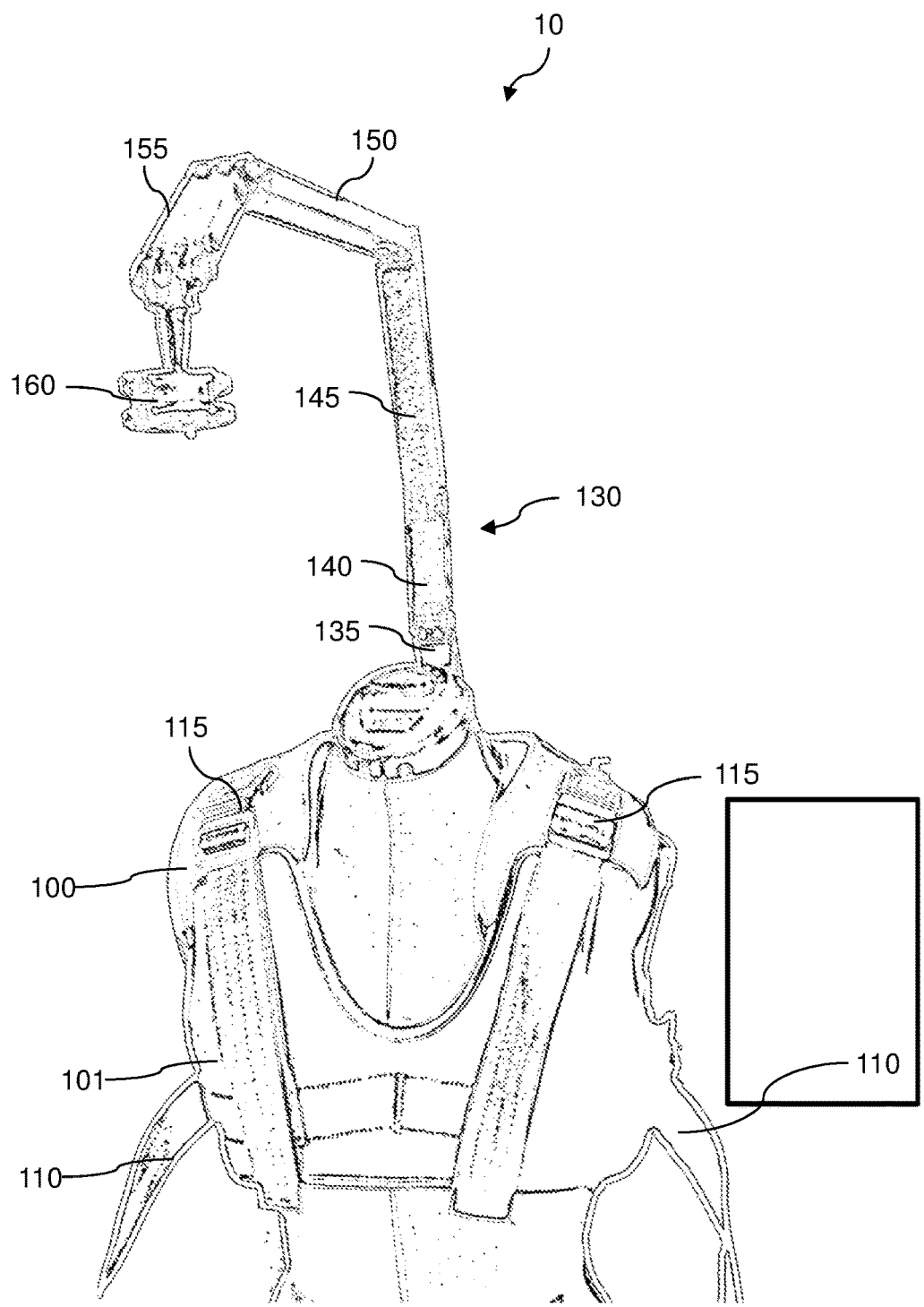
FIG. 2 represents, schematically and in perspective, along a different axis, the first particular embodiment of the harness and positionable arm of the device that is the subject of the present invention.

FIGS. 1 and 2, which are not to scale, show a schematic view of an embodiment of the harness 10 and positionable arm 130 of the device that is the subject of the present invention.

The harness 10 is attached to the back of a user. The harness 10 comprises at least one rigid case 100 configured to prevent any deformation of the case due to the weight of the device and in particular of a camera 30 and a stabilization means 20. The harness 10 also comprises an inner coating 105 made of padded fabric to present increased comfort for the user during the recording.

The rigid case 100 is located on the back of the user and covers at least partially the shoulders and rib cage of the user. The rigid case 100 is associated with a breastplate 101 on the torso of the user. The breastplate 101 is relatively flexible and made of padded fabric to present increased comfort for the user.

In some preferred embodiments, the breastplate 101 at least partially covers the rigid case 100 at the location of the rib cage and shoulders.

The breastplate 101 is assembled onto the rigid case 100 at the location of the user's shoulders by a clamping means 115 on each shoulder and at the location of the rib cage by a clamping means 110 on each side of the user's rib cage.

The clamping means, 110 and/or 115, are straps inserted into attachments corresponding to the straps, for example.

In other embodiments, the breastplate 101 is attached to the rigid case by crimping or sewing, for example. In addition, the breastplate 101 comprises two portions clamped together by clamping means, such as straps in attachments corresponding to the straps, for example.

The harness 10 supports a positionable arm 130 running along the back of the user. Preferably, the positionable arm 130 is at the location of the user's spine to prevent an imbalance of the body due to the device 10 and in particular a force on only one side of the body.

The positionable arm 130 can be attached on the rigid case 100 at the location of the spine, between the shoulder blades, for example.

In other embodiments (not shown), the harness has a rigid case attached to a mount made of fabric. The mount made of fabric at the location of the lumbar vertebrae and comprises two straps configured to be placed around the shoulders of the user. The mount made of fabric can also comprise a strap configured to go around the hips or abdomen of the user. In some embodiments, the mount made of fabric comprises padding to be ergonomic.

The positionable arm 130 takes the form of a set of rectilinear rods, with a rectangular or circular profile, for example, articulated by hinges with parallel axes. Each rod is substantially at a distance from the body of the user. In the embodiment shown in FIGS. 1 and 2, the positionable arm 130 comprises 5 rods, whose lengths and approximate positions are described below:

a first rod 135 running the length of the user's spine to the base of the skull, at the location of the junction with the nape of the neck;

a second rod 140 running the length of the user's skull, from the base of the nape to the top of the skull of the user;

a third rod 145 raising the camera 30 relative to the user's skull;

a fourth rod 150 positioning the camera 30 over the front of the user's skull; and a fifth rod 155 positioning the camera 30 at the location of the user's brow bone.

In the embodiment shown in FIGS. 1 and 2, the hinges are parallel to the axis between the user's shoulders. Each hinge can be tightened by means of a screw, for example.

The fifth rod 155 comprises means 160 for attaching stabilization means 20 to the positionable arm 130.

These embodiments have the advantage of being adaptable to users of different sizes with simple adjustments.

In other simplified embodiments (not shown), the positionable arm 130 comprises a single rod substantially in the form of an arc or inverted "L" and configured to position the camera 30 at the location of the user's brow bone.

The harness 10 comprises means, 120 and 125, for adjusting the position of the camera 30 relative to the harness 10 for a subjective point-of-view recording. The adjustment means, 120 and 125, are located between the positionable arm, 130 or 70, and the harness 10.

The adjustment means 125 are longitudinal adjustment means and the adjustment means 120 are rotary adjustment means. The rod 135 of the positionable arm 130, or the positioning rod 700 of the positionable arm 70, forms a slide that is inserted into an opening of the adjustment means 125 forming a guide slot. The slide and guide slot form a sliding connection whose axis is the axis of the rod 135.

The adjustment means 125 comprise a notch with an axis perpendicular to the axis of the sliding connection slotting into a slot on the rigid case 100 of the harness, the slot and the notch forming the adjustment means 120 and constituting a pivot link and a runner for moving the positionable arm, 130 or 70, from one shoulder to the other.

The adjustment means, 120 and 125, comprise clamping means for locking the positionable arm, 130 or 70, in a position relative to the harness 10. These embodiments make it possible to attach the positionable arm, 130 or 70, relative to the harness 10 in a position before beginning the recording.

Figure 9:
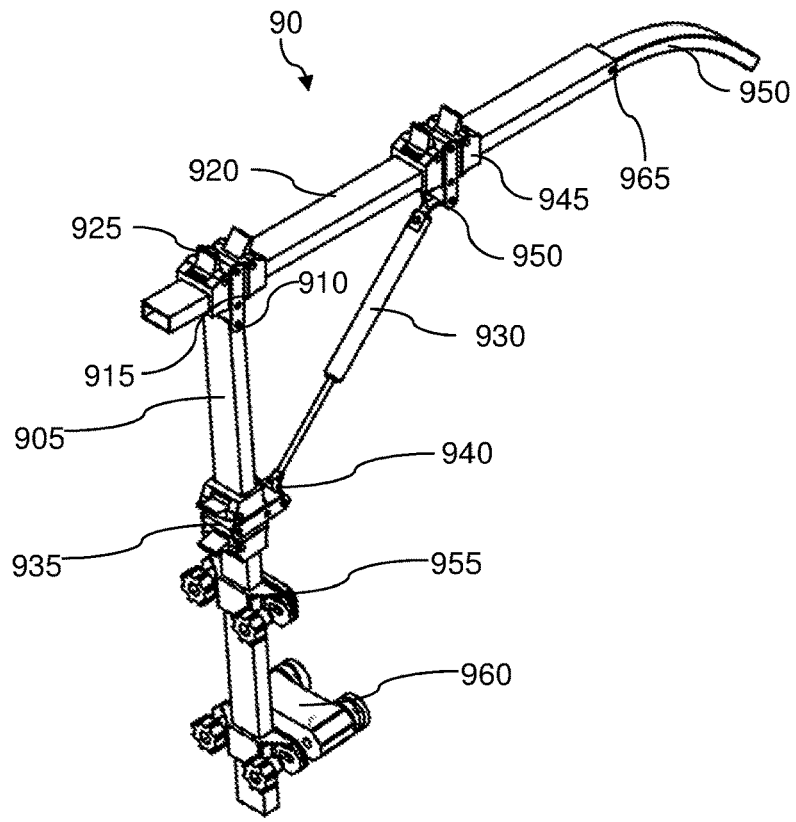
FIG. 9 represents, schematically and in perspective, a third particular embodiment of the positionable arm that is the subject of the present invention.
Figure 10:
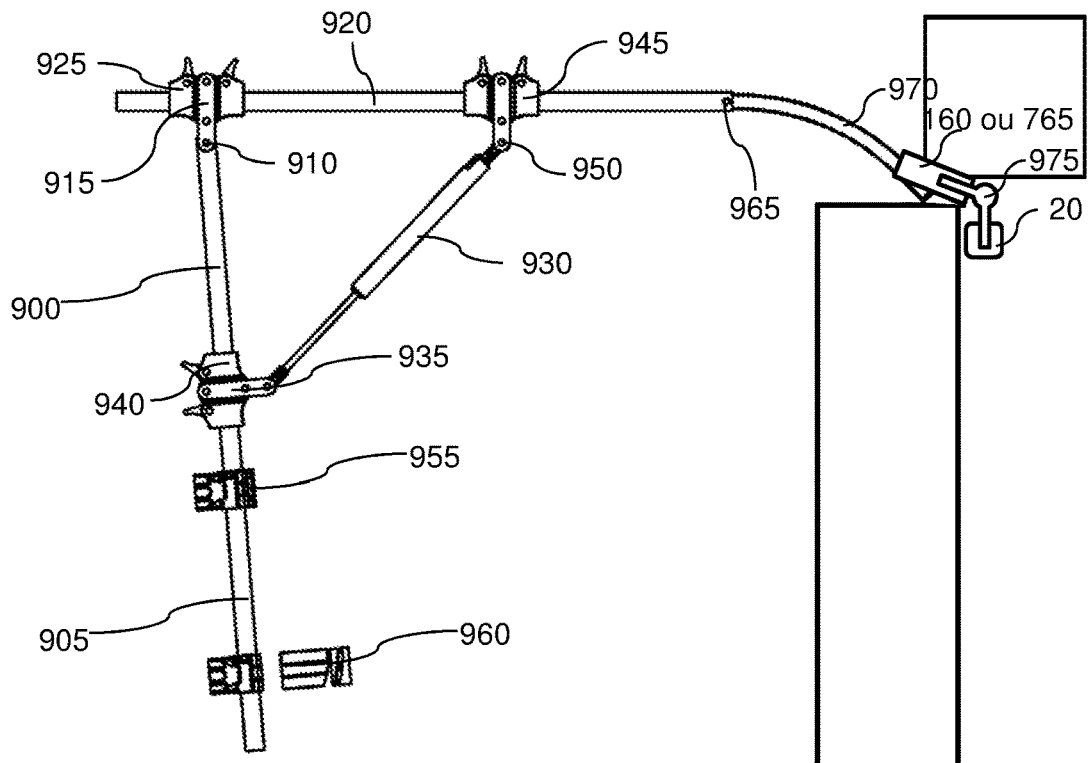
FIG. 10 represents, schematically and in plan, the third embodiment of the positionable arm that is the subject of the present invention.

Embodiments of alternative adjustment means, 950 and 955, are described with regard to FIG. 9.

In some embodiments, the device that is the subject of the present invention comprises a self-contained electric power source 165 to supply the camera 30 with electrical current, the source being located on the harness 10 and configured to counterbalance the camera 30 and the stabilization means 20. The self-contained electric power source 165 can be a lithium battery or any other self-contained electric power source known to the person skilled in the art, for example. The self-contained electric power source 165 is positioned at the location of the base of the rigid case 100 close to the user's kidneys and centered at the location of the spine, for example.

The harness 10 and the positionable arm, 130 or 70, can comprise means for connecting the camera 30 to the self-contained electric power source 165.

In some embodiments, the device that is the subject of the present invention comprises a means 170 for storing each image captured by the camera 30 located on the harness 10 and configured to counterbalance the camera 30 and stabilization means 20. The storage means 170 is a flash memory hard disk, or any other means for storing electronic signals known to the person skilled in the art, for example. The storage means 170 is positioned at the location of the base of the rigid case 100 close to the user's kidneys and centered at the location of the spine, for example, above, below or next to the self-contained electric power source 165, where applicable.

Figure 3:
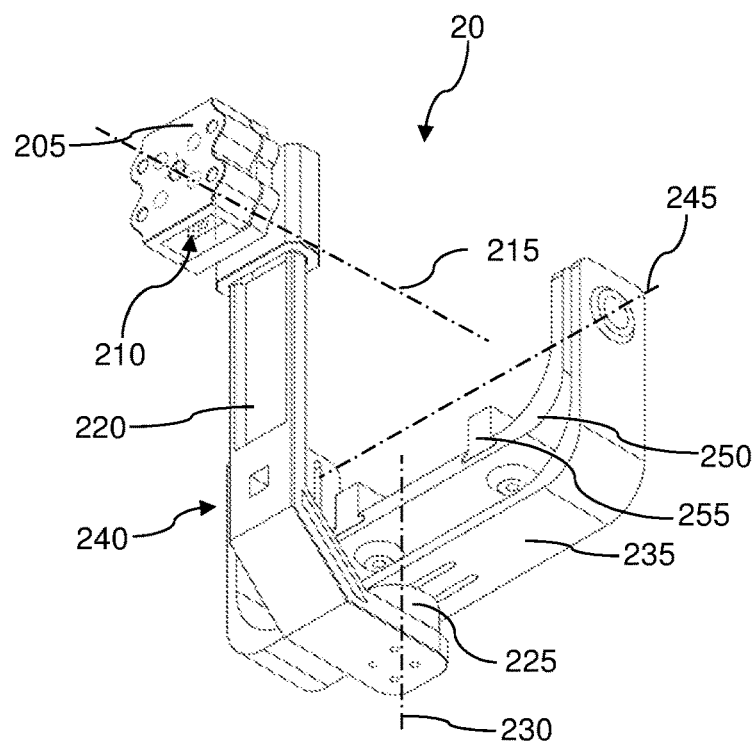
FIG. 3 represents, schematically and in perspective, a first particular embodiment of the stabilization means of the device that is the subject of the present invention.
Figure 4:
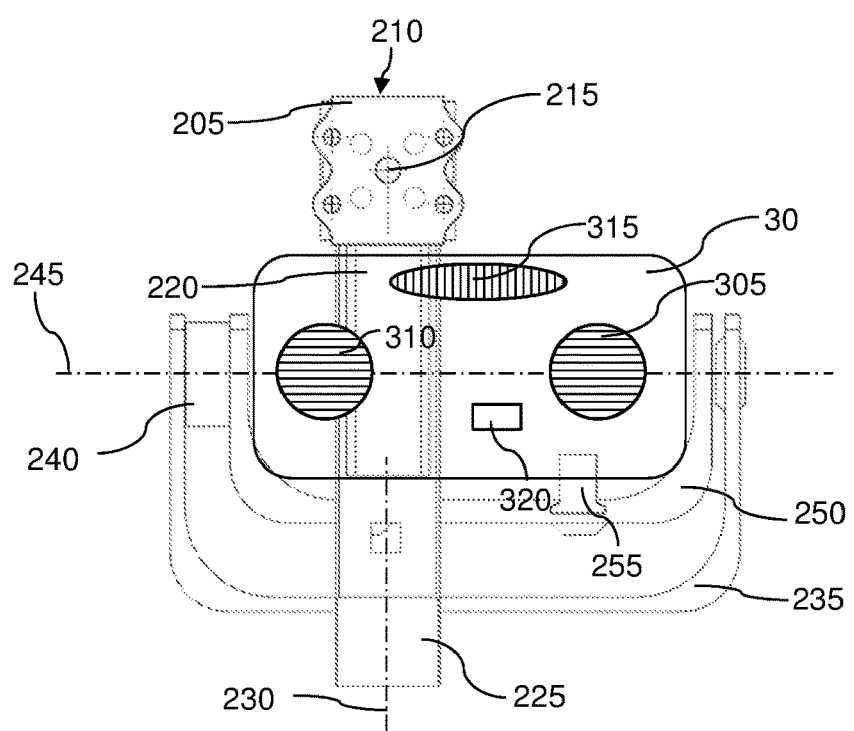
FIG. 4 represents, schematically and in a front view, a first particular embodiment of the stabilization means and camera of the device that is the subject of the present invention.

FIGS. 3, 4 and 5, which are not to scale, show a schematic view of an embodiment of the stabilization means 20 and camera 30 of the device that is the subject of the present invention.

According to a general embodiment, the camera 30 comprises at least one lens, 305 and/or 310, oriented in one direction. In the embodiment shown, the camera 30 comprises two lenses, 305 and 310. However, the description that follows of this particular embodiment may be implemented according to the general embodiment.

The camera 30 comprises at least two lenses, 305 and 310, oriented in the same direction. In the embodiment shown in FIGS. 3, 4 and 5, each lens, 305 and 310, is oriented in the direction of the user's torso. The camera 30 is connected to the harness 10 by a positionable arm 130 running along the back of the user, and positioned above the user for subjective point-of-view recording.

The combination of the two lenses 305 and 310 of the camera is configured to make a three-dimensional recording. Preferably, each lens has a camera angle greater than 90°.

In some preferred embodiments, the camera 30 is a camera marketed by GoPro under the name GoPro 3 (registered trademarks). The GoPro 3 camera automatically performs a synchronization of the recording frame and time synchronization of the lens. These embodiments simplify the image processing carried out subsequently.

In some embodiments, the camera 30 has three lenses, the third lens, referred to as the "calibration" lens, is placed in the middle of the distance between the two other lenses, 305 and 310 as described above. The calibration lens allows the image to be reconstructed in three dimensions more easily since distinctive elements in the images of the two other lenses, 305 and 310, can be replaced computationally relative to distinctive elements of the image from the calibration lens.

In the embodiment shown in FIGS. 4 and 5, the device comprises at least one light-emitting diode ("LED") lighting means 315 attached to the camera 30 and oriented in the direction of the lens 305 and 310. Therefore, the area filmed is constantly lit. Preferably, the lighting means 315 is attached to the camera 30 and is therefore stabilized simultaneously to the camera 30. The lighting means 315 can be located above each lens, 310 and 305.

In some embodiments not shown, the lighting means 315 is attached to the positionable arm, 130 or 70, close to the attachment means, 160 or 765.

Preferably, each light-emitting diode has a power of between 7 and 215 lumens.

The device can comprise two lighting means: a first lighting means 315, referred to as "focused lighting", attached to the camera 30 and emitting light substantially focused in the same direction as each lens, 305 and 310, and a second lighting means, referred to as "ambient lighting", attached to the positionable arm 130 and emitting a light diffused in a general direction substantially similar to the direction of the lenses, 305 and 310.

Preferably, each light-emitting diode is put in operation by an alternating current with a frequency equal to the frequency of recording by the camera 30. In particular, the flashing of the light-emitting diodes is synchronized with the recording by the camera 30. These embodiments make it possible to increase the emitted light power above the nominal light power, to reduce the wear of each light-emitting diode, limit the consumption of electrical energy without affecting the sequence of images captured by the camera.

In some embodiments, at least one light-emitting diode is associated with a polarizing filter, and each lens, 305 and 310, has a polarizing filter with polarization orthogonal to the polarization of each polarizing filter associated with a light-emitting diode. These embodiments make it possible to limit the dazzling due to reflections, in particular on metal surfaces or on the surface of organs, the organic tissues depolarizing the polarized light rays.

The device 10 comprises a means 20 for stabilizing the camera 30 relative to the harness 10 placed between the positionable arm, 130 or 70, and the camera 30. The stabilization means 20 is attached to the attachment means, 160 or 765, of the positionable arm, 130 or 70. And the stabilization means 20 comprises the corresponding attachment means known to the person skilled in the art.

The camera 30 comprises a gyroscope, each servomotor, 210, 225 and 230, of the stabilization means 20 being subordinate to at least one piece of position data of the camera 30 from a gyroscope. Preferably, the camera 30 comprises two gyroscopes oriented differently and configured for locating the camera 30 in space.

In some embodiments, the stabilization means 20 comprises means for connecting the self-contained electric power source 165 and/or the storage means 170.

The stabilization means 20 comprises at least three means for rotating around three perpendicular axes, 215, 230 and 245, each rotation means being equipped with a servomotor, 210, 225 and 240, controlled as a function of the position of the camera 30 and the position of the user. The rotation means are at least one shaft inserted into a hole, for example.

The user's position is evaluated by a gyroscope, in the camera 30 or in each servomotor, 210, 225 and 240. The user's position is evaluated from a predefined position. The predefined position can be a position measured by the gyroscope at the beginning of the recording. Each servomotor, 210, 225 and 240, is a brushless motor.

Preferably, each servomotor, 210, 225 and 240, is cased such that no cable exits from the servomotors, 210, 225 or 240. These embodiments make it possible to use such a device in rooms requiring particular hygiene conditions, known as "clean room", corresponding to the ISO 14644-1 standard.

The stabilization means 20 comprises attachment means 205 corresponding to the attachment means 160 of the repositionable arm 130 or to the attachment means 765 of the positionable arm 70. A first servomotor 210 along a first axis 215 performs a junction between the attachment means 205 and a first mount 220. In the embodiment shown, the first axis 215 is a tilt axis of the camera 30. The axis 215 is eccentric relative to the center of gravity of the camera 30. The servomotor 210 therefore governs the angle, known as "angle of inclination", between the center of gravity of the camera in the predefined position in a normal plane to the axis 215 and the center of gravity of the camera 30 in a position following a movement. The servomotor 210 tends to make the angle of inclination zero for replacing the camera 30 in the predefined position.

The first servomotor 210 makes it possible to mitigate the rotational movements of the user's trunk such that one shoulder or the other is brought closer to the ground, thus producing lateral curvature of the user's trunk. Each lens, 305 and 310, the camera 30 is maintained in the predefined position.

The first mount 220 has an "L" shape such that the camera 30 rests on one of the branches of the "L" by means of a second mount 235 and a third mount 250, the other branch being connected to the servomotor 210. The angle of the "L" can comprise a chamfer or a rounded portion.

In some embodiments, the camera can be suspended on the first mount 220 by means of the second mount 235 and the third mount 250.

The second servomotor 225 of axis 230, perpendicular to the first axis 215, is located between the first mount 220 and the second mount 235. In the embodiment shown, the second axis 230 is the yaw axis. The second axis 230 comprises the center of gravity of the camera 30. The second servomotor 225 tends to modify the angle of the camera 30 such that the lenses of the camera, 305 and 310, have a substantially unchanged recording frame, in particular according to a horizontal of the recording.

The second servomotor 225 makes it possible to mitigate the rotational movements of a user's shoulders to the left or right, thereby producing a twisting of the user's trunk, each lens, 305 and 310, the camera 30 being maintained in the predefined position.

The second mount 235 has a "U" shape. The third mount 250 is attached to the extremities of the "U" by rotation means and the third servomotor 240. The angles of the "U" can comprise a chamfer or be rounded.

The third servomotor 240 is perpendicular, according to a third axis 245, to the first axis 215 and to the second axis 230. The third servomotor 240 is located between the second mount 235 and the third mount 250, at the extremities of the second mount 235. The third axis 245 comprises the center of gravity of the camera 30. In the embodiment shown, the third axis 245 is the pitch axis. The third servomotor 240 tends to modify the angle of the camera 30 such that the lenses, 305 and 310, of the camera 30 have a substantially unchanged recording frame, in particular according to a vertical of the recording.

The third servomotor 240 makes it possible to mitigate the rotational movements of a user's trunk forwards or backwards when a user is standing, thereby producing a curvature of the user's trunk, each lens, 305 and 310, of the camera 30 being maintained in the predefined position.

The third mount 250 has a "U" shape, included in the second mount 235. The extremities of the "U" of the third mount 250 being attached to the extremities of the "U" of the second mount by rotation means and the third servomotor 240. The angles of the "U" can comprise a chamfer or be rounded.

The second and third axes, 230 and 245, define a plane.

The third mount can comprise supply and/or communication means 255 linked to the storage means 170 and/or the self-contained electric power source 165.

The camera 30 is fitted onto the supply and/or communication means 255 in the "U" shape of the third mount 250. At least three edges of the camera 30 are surrounded by the third mount 250.

Preferably, the camera 30 comprises a predefined recording position relative to each axis, 215, 230 and 245, of each servomotor, 210, 225 and 240, and the control of each servomotor, 210, 225 and 240, is configured to:
keep the camera 30 oriented in a predefined direction while a rotation of a servomotor, 210, 225 or 240, is free in the two directions of rotation to keep the frame of the recording substantially unchanged; and
once a stop is reached, move the camera 30 in the predefined recording position to modify the frame of the recording.

If one of the stops of one of the servomotors, 210, 225 and/or 240, is reached, the servomotor that is at the stop performs a rotation until the position recorded during the definition of the predefined position on the axis of the camera concerned by said servomotor. The predefined position can be the position of the camera 30 at the beginning of the recording, or the position in which each servomotor, 210, 225 and 240, has performed a zero rotation. The position in which each servomotor, 210, 225 and 240, has performed a zero rotation, is the position for which each servomotor, 210, 225 and 240, can perform as many turns in one direction of rotation as in the other direction of rotation.

These embodiments are especially useful, in the context of medicine, when an operation is filmed by the surgeon, for not moving the recording frame when the surgeon turns to find a tool, which is a quick movement, and to modify the recording frame, in a stable and attenuated way, when the surgeon performs an operation additional to the longer operation.

These embodiments are also useful in any field in which a manual expertise must be transmitted.

In some embodiments (not shown), the device that is the subject of the present invention comprises a fourth servomotor with an axis parallel to the axis of one of the three other servomotors, the axis of which corresponds to the roll axis of the camera. The fourth servomotor is located between the third mount and the camera, according to an axis parallel to the first axis 215 such that the center of gravity of the camera is at the intersection of the second axis 230, third axis 245 and fourth axis. The second axis 230, third axis 245 and fourth axis define an original orthogonal reference space, the center of gravity of the camera 230.

The fourth servomotor 225 tends to modify the angle of the camera 30 such that the lenses of the camera, 305 and 310, have a substantially unchanged recording frame, in particular according to the axis of observation of the lenses. This makes it possible to avoid slight shaking of the camera, which can be disturbing when viewing captured images.

In some embodiments, the device that is the subject of the present invention comprises a wireless electromagnetic wave emitter-receiver 320 configured to transmit to at least one electronic system (not shown) at least one image captured by the camera 30.

The wireless electromagnetic wave emitter-receiver 320 can be a Bluetooth (registered trademark) emitter-receiver, Wi-Fi (registered trademark) emitter-receiver or according to any other standard known to the person skilled in the art.

The wireless electromagnetic wave emitter-receiver 320 is preferably at the location of the harness 10 of the device, close to the self-contained electric power source 165 and/or of the storage device 170.

In some embodiments, a second camera comprising the wireless electromagnetic wave emitter-receiver 320 is positioned between at least two lenses of the camera 30. The embodiments make it possible to facilitate the framing while transmitting data of low importance relative to the data from the camera 30.

Each image captured can undergo image processing by a microprocessor, digital stabilization or any other image processing.

The device that is the subject of the present invention is equipped with a microprocessor configured to slave the servomotors, 210, 225, 240, to the user's position as a function of the predefined position, to control the recording, storing and wireless communication, and to manage the electrical power supply of the camera 30. In particular, each gyroscope captures movement direction and movement power data, which are transmitted to the microprocessor. Then, the microprocessor commands each servomotor, 210, 225 or 240, to compensate for the movement as a function of the data captured by each gyroscope.

Figure 7:
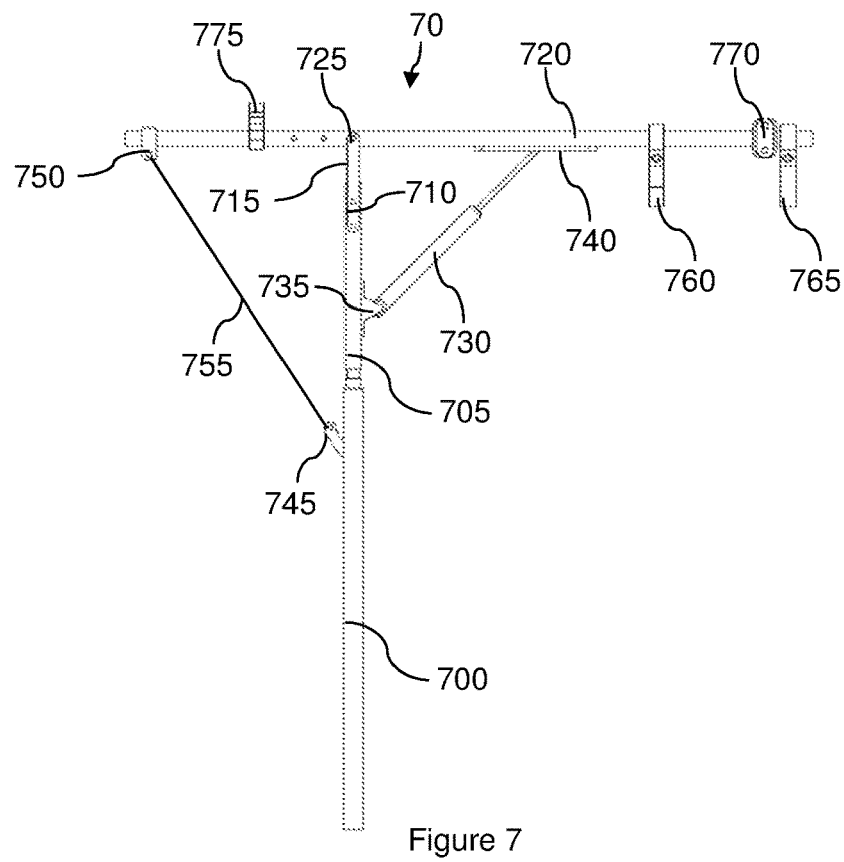
FIG. 7 represents, schematically and in plan, a second particular embodiment of the positionable arm that is the subject of the present invention.
Figure 8:
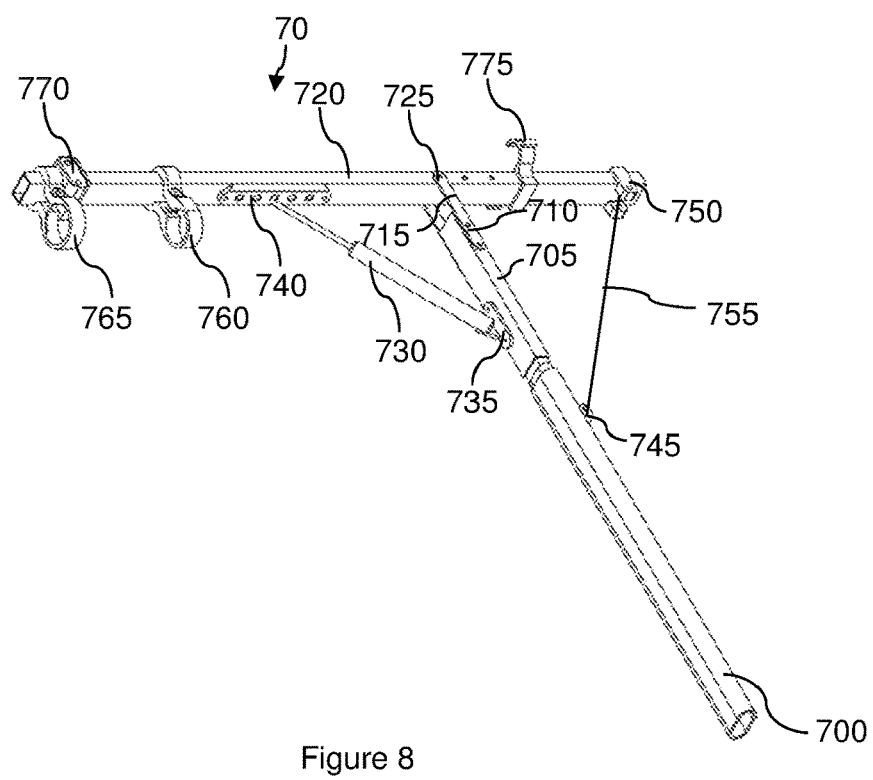
FIG. 8 represents, schematically and in perspective, the second embodiment of the positionable arm that is the subject of the present invention.

FIG. 7 shows a positionable arm 70 of a subjective point-of-view recording device 60. The device 60 comprises:
a harness 10 attached to a user's body;
a camera 30 comprising at least one lens, 305 or 310, oriented in one direction, the camera being connected to the harness by a positionable arm 70 running along the back of the user, and positioned above the user for subjective point-of-view recording in said direction, the positionable arm 70 comprising a rod 700 for placing in position on the articulated harness 10 with a rod 720 for supporting the camera 30 and at least one damper 755 or 730 of the movement between the positioning rod 700 and the supporting rod 720; and
a means 20 for stabilizing the camera relative to the harness placed between the positionable arm 70 and the camera 30.

The positioning rod 700 is attached by a free extremity to the harness 10. Preferably, the rod is attached to the adjustment means, 120 and 125, of the harness 10. The positioning rod 700 is preferably a hollow truncated cylinder. As a reminder, a truncated cylinder is a frustum with a ruled surface whose generatrices are parallel and follow a closed guide curve. A hollow truncated cylinder therefore has two guide curves, one inscribed within the other. In the example shown, the guide curve of the inner shape and the outer shape is oblong in shape.

The positioning rod can comprise an adjustment rod 705. The adjustment rod 705 is inserted into the inner shape of the positioning rod 700 and is reversibly locked in movement by means known to the person skilled in the art, such as a clamping bolt after embedding the adjustment rod in the positioning rod 700. The adjustment rod 705 makes it possible to adjust the height of the supporting rod 720 and therefore of the stabilization means 20 and the camera 30.

The adjustment rod 705 comprises means for articulation 715 with the supporting rod 720. The articulation means 715 are, for example, two plates attached by screwing to a tapped hole 710 of the extremity of the adjustment rod 705 in the extension of the adjustment rod 705. And the articulation means 715 comprises a rotation shaft inserted into a hole 725 perpendicular to the axis between the extremities of the supporting rod 720. Therefore, the positioning rod 700 is in the extension of the adjustment rod 705 and attached relative to the plates 715. And the plates 715 hold fast a shaft passing through a hole 725 of the body of the supporting rod 720 such that the positioning rod 700 prolonged with the adjustment rod 705 form an articulated derrick with the supporting rod 720. The shaft traversed by the hole 725 forms a pivot link between the positioning rod 100 and the supporting rod 720.

In the embodiments without adjustment rod 705, the positioning rod 700 comprises the articulation means 715.

In some embodiments, the supporting rod 720 comprises several holes 725 to adjust the distance of the camera 30 relative to the eyes of the operator so as to have the closest view to that of the operator.

The supporting rod 720 is preferably a hollow truncated cylinder. In the example shown, the guide curve of the inner shape and the outer shape is oblong in shape and can also be rectangular. A hollow truncated cylinder makes it possible to reduce the weight of the device 60.

More generally, each rod comprises a body and two extremities and the supporting rod 720 is attached by a pivot link with the positioning rod 700 such that a wireframe representation of the rods, 700 and 720, may be substantially in a single plane regardless of the angle between the supporting rod 720 and the positioning rod 700.

Preferably, the articulation between the positioning rod 700 and the supporting rod 720 is located at one extremity of the positioning rod 700 and on the body of the supporting rod 720, the supporting rod 720 and the positioning rod 700 forming a derrick.

The positionable arm 70 comprises at least one first damper 755 attached between one extremity of the supporting rod 720 and the body of the positioning rod 700.

The supporting rod 720 comprises, at one extremity, means, 760 and 765, for attaching the stabilization means 20. The attachment means, 760 and 765, can enclose a means for controlling the camera 30.

The first damper 755 is attached to the other extremity of the supporting rod 720. The first damper 755 mainly operates in traction. That is to say that over half of the forces damped by the first damper 755, exert traction on the first damper 755. The first damper 755 is a traction spring, for example. In some embodiments, the first damper 755 is a hydraulic or pneumatic traction or compression spring.

The first damper 755 is attached to the body of the positioning rod 700. Preferably, the attachment means 745 of the first damper 755 is located close to the extremity of the positioning rod 700 joining the positioning rod 700 to the adjustment rod 705 that form an assembly.

The attachment means 745 is, for example, a flat notch, welded or attached to the rod 700, comprising a hole, the hole being traversed by a hook connected to one extremity of the first damper 755.

The attachment 750 of the first damper 755 to the supporting rod 720 can be similar to the attachment means 745. Or the attachment 750 of the first damper 755 can be arranged on a means for moving the attachment 750 on the supporting rod 720. The moving means is, for example, a ring partially surrounding the supporting rod 720 that can be clamped by tightening a nut. The moving means can therefore be attached or, when loosened, be moved on the supporting rod 720. The attachment 755 is thus a hole made in the ring or in a notch borne by the ring.

The attachments, 745 and 755, are positioned such that the first damper 755 can be joined to each attachment, 745 and 755, without encountering any material.

The device 10 comprises at least one second damper 730 between the body of the supporting rod 720 and the body of the positioning rod 100.

The second damper 730 is attached to the body of the supporting rod 720 between the articulation, 715 and 725, with the adjustment rod 705 and the extremity of the supporting rod 720 comprising the stabilization means 20. The second damper 730 is a compression damper, such as a compression gas spring, for example. In some embodiments, the second damper 730 is a hydraulic or pneumatic cylinder, or an ordinary spring. The second damper 730 can operate in traction or in compression.

The second damper 730 is attached to the body of the adjustment rod 705. Preferably, the attachment means 735 of the first damper 730 is located close to the extremity of the adjustment rod 705 joining the positioning rod 700 to the adjustment rod 705 that form an assembly.

The attachment means 735 is, for example, a flat notch, welded or attached to the rod 720, comprising a hole, the hole being traversed by a hook connected to one extremity of the second damper 730. The hole can also be traversed by a nut inserted into a hole connected to a hook at one extremity of the second damper 730.

The attachment 740 of the second damper 730 to the supporting rod 720 can be similar to the attachment means 735. Or the attachment 740 of the second damper 740 can be arranged on a means for moving the attachment 740 on the supporting rod 720. The movement means is, for example, one hole among several aligned holes of the supporting rod 720 in which one extremity of the second damper 730 is attached.

The attachments, 735 and 740, are positioned such that the second damper 730 can be joined to each attachment, 735 and 740, without encountering any material.

In some embodiments, the arm 70 comprises several first dampers 755 mounted in parallel. In some embodiments, the arm 70 comprises several second dampers 730 mounted in parallel.

Preferably, each first and each second damper, 730 and 755, is located either side of the positioning rod. The articulation, 710, 715 and 720, between the supporting rod 720 and the positioning rod 700 joined to the adjustment rod 705 separates the supporting rod into two portions. Preferably, the attachment means 750 are on one of the portions and the attachment means 740 are on the other portion. Preferably, the attachment means 740 are on the portion comprising the attachment means, 760 and 765, of the stabilization means.

In some embodiments, the arm 70 comprises a battery mount 775 on the body of the supporting rod 20, on the opposite side of the articulation, 710, 715 and 720, relative to each attachment means 760 and 765. The battery mount 775 is, for example, a clip, attached to the supporting rod 20.

In some embodiments, the arm 70 comprises at least one means 770 for attaching at least one articulated arm mount of at least one light source. The attachment means can be a ring, which can be tightened by a nut, placed around the supporting rod 720. The tightenable ring comprises means for attaching the arm known to the person skilled in the art.

FIG. 9 shows a positionable arm 90 of a subjective point-of-view recording device 60. The device 60 comprises:
- a harness 10 attached to a user's body;
- a camera 30 comprising at least one lens, 305 or 310, oriented in one direction, the camera being connected to the harness by a positionable arm 90 running along the back of the user, and positioned above the user for subjective point-of-view recording in said direction, the positionable arm 90 comprising a rod 905 for placing in position on the articulated harness 10 with a rod 920 for supporting the camera 30 and at least one damper 930 of the movement between the positioning rod 905 and the supporting rod 920; and
- a means 20 for stabilizing the camera relative to the harness placed between the positionable arm 90 and the camera 30.

The positioning rod 905 is attached by a free extremity to the harness 10. Preferably, the rod is attached to the adjustment means, 955 and 960, of the harness 10. The positioning rod 905 is preferably a hollow truncated cylinder. As a reminder, a truncated cylinder is a frustum with a ruled surface whose generatrices are parallel and follow a closed guide curve. A hollow truncated cylinder therefore has two guide curves, one inscribed within the other. In the example shown, the guide curve of the inner shape and the outer shape is oblong, preferably rectangular, in shape.

The harness 10 comprises means, 955 and 960, for adjusting the position of the camera 30 relative to the harness 10 for a subjective point-of-view recording. The adjustment means, 955 and 960, are located between the positionable arm 90 and the harness 10.

The adjustment means, 955 and 960, are longitudinal adjustment means making it possible to adjust the vertical distance between the supporting rod 920 and the harness when the harness is carried by an operator. The positioning rod 905 of the positionable arm 90, or the positioning rod 700 of the positionable arm 70, forms a slide that is inserted into an opening of the adjustment means, 955 and 960 forming a guide slot. The slide and guide slot form a sliding connection whose axis is the axis of the positioning rod 905.

The adjustment means, 955 and 960, comprise clamping means for locking the positionable arm, 70 or 90, in a position relative to the harness 10. The clamping means are, for example, a plate attached by two screws to the adjustment means, 955 or 960, the tightening of the screws resulting the plate being brought closer to the adjustment means, 955 or 960. These embodiments make it possible to attach the positionable arm, 70 or 90, relative to the harness 10 in a position before beginning the recording.

The adjustment means 955 create a distance with the harness in a plane perpendicular to the axis of the positioning rod 905 that is shorter than the distance between the adjustment means 960 and the harness in a plane perpendicular to the axis of the positioning rod 905. Preferably, the distance between the adjustment means 955 and the harness in a plane perpendicular to the axis of the positioning rod 905 is at least two times shorter than the distance between the adjustment means 960 and the harness in a plane perpendicular to the axis of the positioning rod 905.

In some embodiments, the positioning rod 905 can comprise an adjustment rod. The adjustment rod is inserted into the inner shape of the positioning rod 905 and is reversibly locked in movement by means known to the person skilled in the art, such as a clamping bolt after embedding the adjustment rod in the positioning rod 905. The adjustment rod makes it possible to adjust the height of the supporting rod 920 and therefore of the stabilization means 20 and the camera 30.

The supporting rod 920 is preferably a hollow truncated cylinder. In the example shown, the guide curve of the inner shape and the outer shape is oblong in shape and can also be rectangular. A hollow truncated cylinder makes it possible to reduce the weight of the device 60.

Preferably, electrical cables pass inside the hollow cylinder of the rods, 905 and 920. The electrical cables can connect the camera to a battery or any other electronic element detailed above, located on the harness 10.

More generally, in a wireframe representation of the rods, 905 and 920, the rods 905 and 920, may be substantially in a single plane regardless of the angle between the supporting rod 920 and the positioning rod 905. Preferably the positioning rod 905 and the supporting rod 920 form a derrick.

The positionable arm 90 comprises at least one attachment means, 915, 935 or 945, connecting two elements:
- the positioning rod 905 and the supporting rod 920;
- the positioning rod 905 and the damper 930; and/or
- the supporting rod 920 and the damper 930.

Preferably, at least one attachment means, 915, 935 or 945, forms at least one sliding pivot link, 910, 940 or 950, with one of the elements, and at least one swivel link with the other element.

Preferably, at least one attachment means, 915, 935 or 945, comprises the guide slot of the at least one sliding pivot link, the element forming a slide, the attachment means, 915, 935 or 945, comprises at least one cam lever, 1110 or 1120, for tightening the slide in the guide slot.

It is recalled here that a cam lever is a lever set in rotation relative to a part, which comprises a circular cam whose center is eccentric relative to the axis of rotation. The rotation of the lever therefore results in a movement of the part matching the dimensions of the cam. In addition, when this part is a slide in a guide slot, the slide locks against the guide slot.

Preferably, the attachment means, 915, 935 or 945, comprises two cam levers, 1110 and 1120, whose levers are in opposite directions. In other terms, the direction of rotation of each level is opposite. Therefore, a translation of the slide tightens one of the levers and loosens the other.

Preferably, the axes of rotation of the levers are parallel to the axis of rotation of the pivot link, 910, 940 or 950, of the attachment means 915, 935 or 945. And the axes of rotation of the pivot links, 910, 940 or 950, of the attachment means 915, 935 or 945, are in a plane perpendicular to the plane of the wireframe representation of the rods, 905 and 920.

Figure 11:
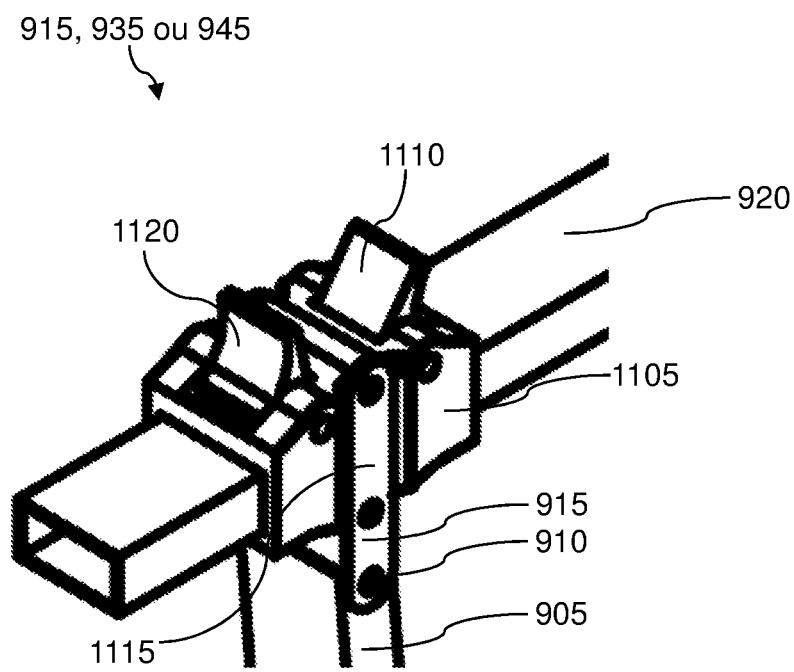
FIG. 11 represents, schematically and in perspective, a particular embodiment of a means for attaching a positionable arm.

The attachment means, 915, 935 or 945, is described with regard to FIG. 11.

The articulated arm 90 comprises a first attachment means 915 between the positioning rod 905 and the supporting rod 920, the attachment means 915 forms a sliding connection with the supporting rod 920 and a pivot link 910 with the positioning rod 905. In some embodiments not shown, the attachment means 915 forms a sliding connection with the positioning rod 905 and a pivot link 910 with the supporting rod 920.

Preferably, the attachment means 915 is located at one extremity of the positioning rod 905 and one extremity of the supporting rod 920. The attachment means 915 is a removable attachment means, in particular at the location of the at least sliding pivot link.

An at least swivel link or at least one swivel link refers to a link that comprises three degrees of freedom in rotation. An at least pivot link or at least one sliding pivot link refers to a link that comprises one degree of freedom in translation and one degree of freedom in rotation. Links that are more restrictive in degrees of freedom therefore fall with the above definitions.

Preferably, in which each rod, 905 and 920, and the damper 930, comprises one body and two extremities.

The articulated arm 90 comprises a second attachment means 935 between the positioning rod 905 and the damper 930, the attachment means 935 forms a sliding connection with the positioning rod 905 and a pivot link 940 with the damper 930. In some embodiments not shown, the attachment means 935 forms a sliding connection with the damper 930 and a pivot link 940 with the positioning rod 905.

Preferably, the attachment means 935 is located at one extremity of the damper 930 and on the body of the positioning rod 905. The attachment means 935 is a removable attachment means, in particular at the location of the at least sliding pivot link.

The articulated 90 comprises a third attachment means 945 between the supporting rod 920 and the damper 930, the attachment means 945 forms a sliding connection with the supporting rod 920 and a pivot link 950 with the damper 930. In some embodiments not shown, the attachment means 945 forms a sliding connection with the damper 930 and a pivot link 950 with the supporting rod 920.

Preferably, the attachment means 945 is located at one extremity of the damper 930 and on the body of the supporting rod 920. The attachment means 945 is a removable attachment means, in particular at the location of the at least sliding pivot link.

Preferably, each slide has a rectangular cross-section adapted to the rectangular cross-section of each guide slide. In other terms, the positioning rod 905 and the supporting rod 920 have rectangular cross-sections.

Preferably the damper 930 mainly operates in compression. That is to say that over half of the forces damped by the first damper 930, exert compression on the first damper 930. The first damper 930 is a compression spring, for example. In some embodiments, the first damper 930 is a hydraulic or pneumatic traction or compression spring.

In some embodiments, the arm 90 comprises a second damper is attached to the body of the positioning rod 905 and to one extremity of the supporting rod 920 opposite the extremity bearing the camera 30. The second damper is attached by attachment means described in the description of FIGS. 1 to 11.

In some embodiments, the arm 90 comprises several dampers mounted in parallel.

Preferably, each first and each second damper 930 is located either side of the positioning rod 920.

In some embodiments, the stabilization means is attached to a free extremity of the supporting rod having a circular arc shape 970. Preferably, the angle between the tangents at each extremity of the arc of the circle 970 is less than 45 degrees. The extremity of the arc of the circle 970 can be clipped into the supporting rod 920 in the extension of the supporting rod 920.

In some embodiments, the attachment means 160 or 765 comprise an element fitted into the extremity of the arc of the circle 970. The element fitted can have a parallelepiped shape with dimensions corresponding to the dimensions of the extremity of the arc of the circle 970 and a protrusion not fitted into the extremity of the arc of the circle 970.

The fitted element preferably comprises two pivots 975 for connecting to the stabilization means 20. One pivot 975 comprises two rods joined together by a pivot link. One rod of each pivot is attached around the element, the protrusion of the parallelepiped element either side of the parallelepiped element so as to be in the extension of the positioning rod 920. The pivot link of the pivot 975 is in a plane perpendicular to a plane of a wireframe representation of the supporting rod 905 and the positioning rod 920. The pivots make it possible to straighten or tilt the stabilization equipment to place the camera close to the operator's eyes. The other rod of the pivot 975 is attached around the stabilization means 20.

Preferably, each pivot comprises a means for resetting the position, such as a spring. The direction of the force of the position resetting means are positioned in the opposite direction to make the path of the pivots plastic. That is to say that, by application on one rod of a pivot 975 or on the other, the two pivots 975 pivot. The pivots are therefore not returned to a position, but offer some resistance so as to position the stabilization means 20 as precisely as possible.

The supporting rod 920 comprises, at the extremity of the arc of the circle, means for attaching the stabilization means 20. The attachment means can enclose a means for controlling the camera 30. The attachment means correspond to at least one attachment means described in the present description.

In some embodiments, the arm 90 comprises a battery mount on the body of the supporting rod 920, on the opposite side of the attachment means 915 relative to each means for attaching the camera 30. The battery mount is, for example, a clip, attached to the supporting rod 920.

In some embodiments, the arm 90 comprises at least one means for attaching at least one articulated arm mount of at least one light source. The attachment means can be a ring, which can be tightened by a nut, placed around the supporting rod 920. The tightenable ring comprises means for attaching the arm known to the person skilled in the art.

The invention claimed is:

1. A subjective point-of-view recording device, comprising:
    a harness attached to a body of a user;
    a positionable arm including:
        a positioning rod being configured for placing in position on the harness and extending along the back of the user over the head of the user;
        a supporting rod extending between said positioning rod and above the user's forehead and being configured for hands-free support of a camera positioned above the user, over the front of the user's skull adjacent the user's brow bone, such that said camera records images from a subjective point-of-view relative to the user's eyes and such that the camera being oriented according to movements of the user's trunk and shoulders;
    at least one damper for damping movements between the positioning rod and the supporting rod; and
    a means for stabilizing the camera relative to the harness placed between the positionable arm and the camera, said means for stabilizing includes rotation means for rotating the camera with respect to the harness and a gyroscope for evaluating movement of the harness;

wherein said means for stabilizing is configured to determine a predefined recording position and said rotation means is configured to rotate the camera to said predefined recording position in response to movement of the harness;

wherein said means for stabilizing is configured to modify said predefined recording position when said rotation means reaches a stop limiting rotation of said camera.

2. The device according to claim 1, which comprises at least one attachment means connecting two of the following elements:

the positioning rod and the supporting rod;
the positioning rod and the damper; and/or
the supporting rod and the damper.

3. The device according to claim 2, wherein at least one attachment means forms at least one sliding pivot link with one of the elements, and at least one swivel link with the other element.

4. The device according to claim 3, wherein said at least one attachment means comprises a guide slot of the at least one sliding pivot link, a slide, and at least one cam lever for tightening the slide in the guide slot.

5. The device according to claim 4, wherein the attachment means comprises two cam levers whose levers are in opposite directions.

6. The device according to claim 1 wherein the damper mainly operates in compression.

7. The device according to claim 1, wherein the stabilization means is attached to a free extremity of the supporting rod having a circular arc shape.

8. The device according to claim 1, wherein each rod comprises one body and two extremities, the articulation between the positioning rod and the supporting rod is located at one extremity of the positioning rod and on the body of the supporting rod, the supporting rod and the positioning rod forming a derrick.

9. The device according to claim 8, which comprises at least one first damper attached between one extremity of the supporting rod and the body of the positioning rod.

10. The device according to claim 9, wherein the stabilization means is attached to the extremity of the supporting rod opposite the attachment extremity of each first damper.

11. The device according to claim 9, which comprises at least one second damper between the body of the supporting rod and the body of the positioning rod.

12. The device according to claim 11, wherein each first and each second damper is located either side of the positioning rod.

13. The device according to claim 11, wherein the second damper is a compression damper.

14. The device according to claim 9, wherein the attachment of at least one damper with the supporting rod comprises a means for moving the attachment on the supporting rod.

15. The device according to claim 1, which comprises at least one means for attaching the stabilization means to one extremity of the supporting rod.

16. The device according to claim 15, which comprises a battery mount on the body of the supporting rod, on the opposite side of the articulation relative to each attachment means.

17. The device according to claim 1, which comprises at least one means for attaching at least one articulated arm mount of at least one light source to the articulated arm.

* * * * *